Jan. 17, 1939. D. L. DRISCOLL 2,144,146
BUSHING AND SLIP ASSEMBLY
Filed April 24, 1936 2 Sheets-Sheet 1

Inventor
DENNIS L. DRISCOLL
By
His Attorney

Jan. 17, 1939.    D. L. DRISCOLL    2,144,146
BUSHING AND SLIP ASSEMBLY
Filed April 24, 1936    2 Sheets-Sheet 2
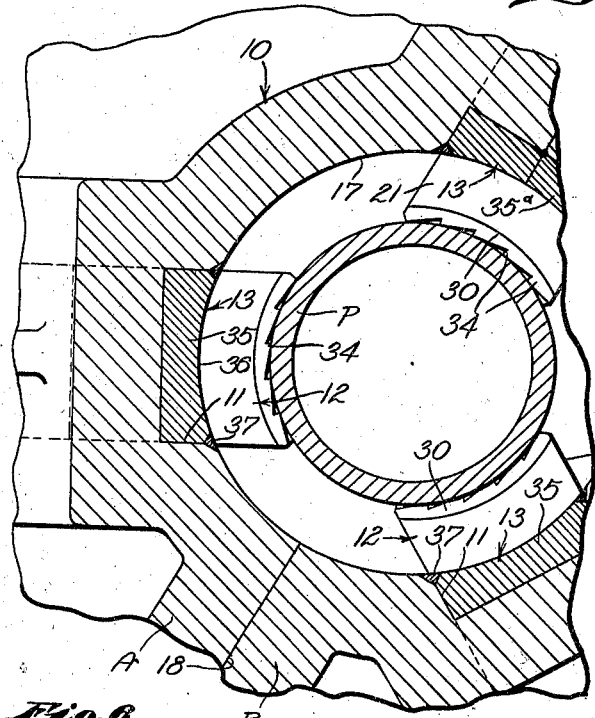
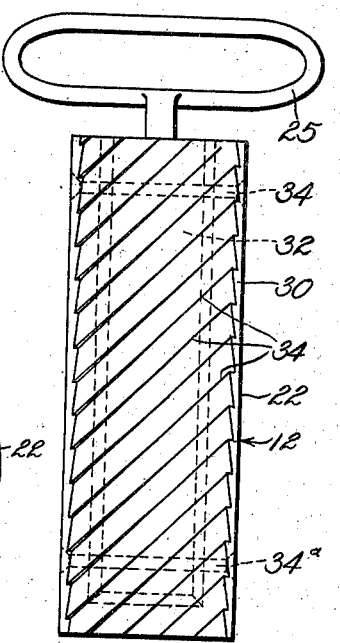
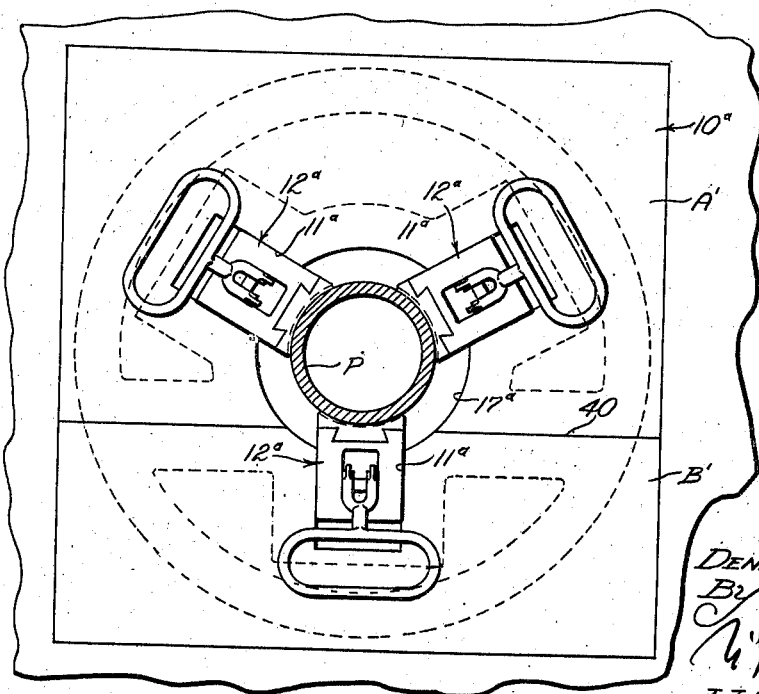
Inventor
DENNIS L. DRISCOLL
By
His Attorney Patented Jan. 17, 1939

2,144,146

UNITED STATES PATENT OFFICE 2,144,146

BUSHING AND SLIP ASSEMBLY

Dennis L. Driscoll, Los Angeles, Calif., assignor to Lawrence F. Baash, Los Angeles, Calif.

Application April 24, 1936, Serial No. 76,196

4 Claims. (Cl. 24—263)

This invention relates to well drilling equipment and relates more particularly to a bushing and slip assembly for use in the rotary table of a well drilling rig. A general object of this invention is to provide a practical, improved and particularly effective bushing and slip assembly for a rotary table.

Another object of this invention is to provide an improved bushing and slip assembly of the general character fully described and claimed in my co-pending application entitled Well drilling apparatus, Serial No. 67,080, filed March 4, 1936.

Another object of this invention is to provide a bushing for a rotary table having slots for receiving pipe gripping slips and embodying simple, dependable means for limiting the downward movement of the slips in the slots.

Another object of the invention is to provide a bushing of the character mentioned in which the means for limiting the downward movement of the slips in the slots serve to close the lower ends of the slots to prevent the pipe and the coupling parts on the pipe from entering the slots and from wearing away or breaking the parts defining the slots.

Another object of the invention is to provide a bushing and slip assembly of the character mentioned embodying slips having novel and particularly effective pipe engaging parts or shoes.

A further object of the invention is to provide a rotary table bushing divided into two sections in a plane of division spaced from its central vertical axis whereby one section is larger than the other, the larger section having two slots for receiving slips and the smaller section having one slip receiving slot.

Figure 1:
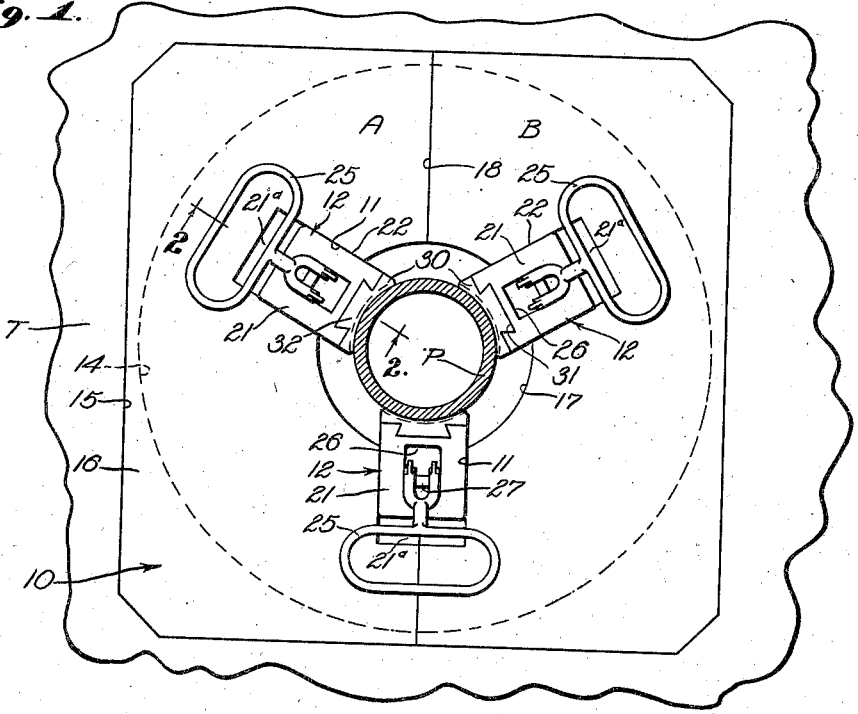
Figure 2:
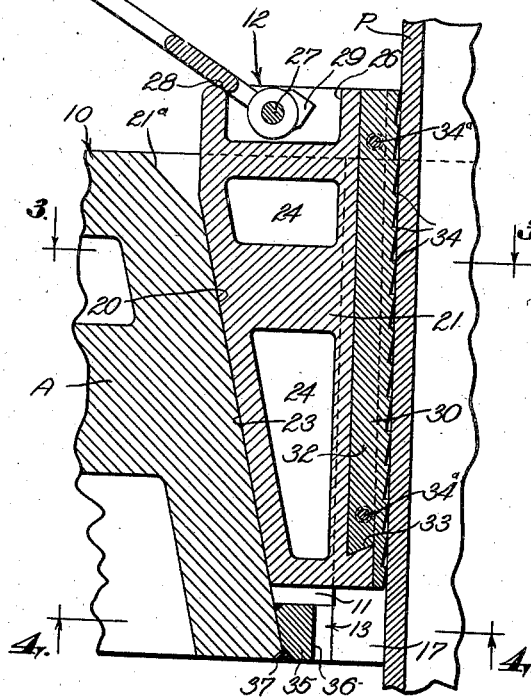
Figure 3:
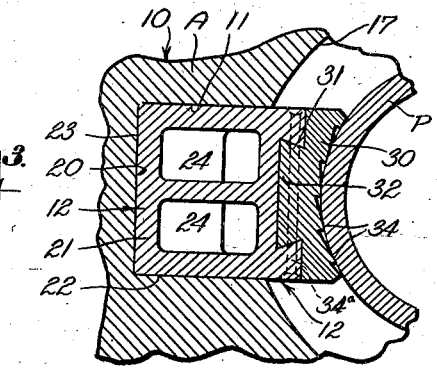

The various objects and features of my invention will be fully understood from the following detailed description of typical preferred forms and applications of the invention, throughout which description reference is made to the accompanying drawings, in which:

Fig. 1 is a top or plan view of one embodiment of the invention illustrating the slips in position in the bushing and engaging a pipe. Fig. 2 is an enlarged fragmentary vertical detailed sectional view taken as indicated by line 2—2 on Fig. 1. Fig. 3 is a transverse fragmentary detailed sectional view taken as indicated by line 3—3 on Fig. 2. Fig. 4 is a fragmentary transverse detailed sectional view taken substantially as indicated by line 4—4 on Fig. 2. Fig. 5 is an elevation view of the inner side of one of the slips removed from the bushing and Fig. 6 is a top or plan view of another form of the invention.

The embodiment of the invention illustrated in Figs. 1 to 5, inclusive, of the drawings includes, generally, a sectional bushing 10 having slots 11 in its interior, slips 12 for arrangement in the slots 11, and means 13 for limiting the downward movement of the slips 12 in the slots 11.

The bushing 10 is intended for arrangement in the rotary table of a well drilling rig. In accordance with the invention the bushing 10 may be designed for use in various types and forms of rotary tables. In the particular case illustrated in the drawings the bushing 10 is employed in a rotary table T having a round vertical opening 14 and a polygonal or square recess 15 in the upper end of the opening 14. The bushing 10 fits in the opening 14 and is provided with a square flange 16 cooperating with the recess 15. The cooperation of the flange 16 with the recess 15 causes the bushing 10 to rotate with the table T. The bushing 10 is provided with a central opening 17 for receiving and passing the pipe P and other drilling equipment. In accordance with the invention, the opening 17 is cylindrical or of substantially uniform diameter throughout its length. The bushing 10 is preferably sectional to facilitate its assembly in the table T. In the form of the invention being described the bushing 10 is divided or separated at a diametric vertical plane 18 into two equal sections A and B.

The slots 11 are provided in the wall of the opening 17 to receive the slips 12. In the preferred arrangement illustrated there are three equally spaced slots 11. The slots 11 being equally spaced are substantially 120° apart. In the form of the invention being described there is one slot 11 in each section A and B and the third slot 11 has its vertical or longitudinal center in the plane of separation 18 so that it is formed in adjacent parts of the two bushing sections A and B. The slots 11 are preferably identical in size and shape. The shape and proportioning of the slots 11 are features of the invention. The slots 11 are elongated vertically and preferably extend between the upper and lower ends of the bushing opening 17. In accordance with the invention the slots 11 have flat parallel side walls and inclined inner walls 20. In the particular case illustrated the inclined walls 20 are flat, it being understood that these walls 20 may be convexed or concaved if desired. The slot walls 20 are inclined downwardly and inwardly relative to the central vertical axis of the bushing opening 17. The walls 20 are uniformly pitched and extend throughout the major portion of the vertical extent or thickness of the bushing 10. Downwardly and inwardly inclined faces 21ᵃ join the upper ends of the bushing walls 20. The faces 21ᵃ are inclined at a greater angle to the vertical than the walls 20 and are provided to assist in entering or guiding the slips 12 into the slots 11.

The slips 12 are to be arranged in the slots 11 to grip the pipe P or a similar object extending through the bushing 10. There is a slip 12 for arrangement in each slot 11 and the three slips are preferably alike or identical. Each slip 12 includes a body 21 having flat parallel sides 22 and an inclined inner surface 23. The surfaces 23 are flat and of substantially the same inclination as the slot walls 20 to have even full cooperation therewith. The sides 22 of the slip bodies 21 are adapted to cooperate with or bear on the side walls of the slots 11. The slip bodies 21 are sufficiently long to extend from adjacent the lower ends of the slots 11 to points above the upper surface of the bushing 10. The slip bodies 21 are hollow or provided with chambers 24 to be light in weight and readily handled. Suitable handles 25 are provided on the slips 12. The handles 25 may be of any suitable construction and may be secured to the slip bodies 21 as found most desirable. In the case illustrated in the drawings recesses 26 are provided in the upper ends of the slip bodies 21 and pivot pins 27 extend through the recesses 26 to pivotally secure the handles 25 to the bodies of the slips. The handles 25 are adapted to engage the slip bodies 21 at the rear walls of the recesses 26 as shown at 28 to be in position for ready engagement or grasping. Lugs 29 may be provided on the handles 25 adjacent the pivot pins 27 to limit the inward swinging or pivoting of the handles.

The invention provides wear taking liners or shoes 30 on the slip bodies 21. The shoes 30 are removably secured to the bodies of the slips 11. Longitudinal dove-tailed grooves 31 are provided in the inner vertical sides of the slip bodies 21. Dove-tailed tongues 32 are provided on the shoes 30 to cooperate with the grooves 31. The shoes 30 are adapted to fully and evenly bear on the inner sides of the slip bodies 21 and cooperation of the grooves 31 and tongues 32 assists in positioning and retaining the shoes in place. The lower walls 33 of the grooves 31 slope upwardly and inwardly and the lower ends of the tongues 32 are correspondingly inclined. The cooperation of the lower ends of the tongues 32 with the walls 33 assists in locking the shoes 30 on the slip bodies. Rods or rivets 34ᵃ extend through transverse or horizontal openings in the slip bodies 21 and the tongues 32 to removably secure the shoes 30 to the bodies 21. The active pipe engaging faces of the shoes 30 are concaved to substantially conform to the pipe P. Gripping wickers or teeth 34 are provided on the active concaved surfaces of the shoes 30. It is preferred to pitch the teeth 34 at a comparatively steep angle as illustrated in Fig. 5 to more effectively grip the object or pipe P. The wickers or teeth 34 being pitched in this manner dependably prevent relative rotation between the pipe and the slips without scoring or cutting the pipe and in the event the pipe suddenly drops or moves downwardly the sharply pitched teeth cushion the engagement of the pipe with the slips by effecting slight turning between them. In practice it has been found desirable to cut the wickers or teeth 34 with a six inch lead and a one quarter inch pitch.

The means 13 for limiting the downward movement of the slips 12 in the slots 11 prevent the loss of the slips from the slots. The means 13 comprise stop members 35 at the lower ends of the slots 11. The members 35 preferably occupy the lower end portions of the slots 11 as illustrated in Figs. 2 and 4 of the drawings. The lower sides of the members 35 may be flush with the lower side of the bushing 10, the members 35 having surfaces 36 flush with the wall of the bushing opening 17. The surfaces 36 are preferably concaved and of the same cylindrical curvature as the wall of the opening 17. The bushing 10 having the members 35 occupying the lower portions of the slots 11 presents a continuous annular face at the lower end of the opening 17. The members 35 are preferably of hard material to be wear resisting. The stop members 35 are adapted to be arranged in the slots 11 after the slots have been ground or otherwise machined. In the typical construction illustrated the members 35 are welded to the bushing sections A and B at 37. Where one of the slots 11 has its central vertical axis coincident with the plane 18, the member 35 in the said slot comprises two equal sections 35ᵃ, each secured to a section of the bushing 10.

In operation the bushing sections A and B are arranged in the table T as shown in the drawings and the slips 12 may be readily slid in the slots 11 to engage and grip the pipe P. The slips 12 are entered in the upper ends of the slots 11 and the surfaces 21ᵃ assist in directing and guiding the slips into the slots. The cooperation of the slip faces 23 with the slot walls 20 urges the slips into gripping cooperation with the pipe and maintains the slips in proper engagement with the pipe. The full, extensive and evenly cooperating surfaces 23 and walls 20 prevent the slips 12 from rocking or tilting and maintain the slips in vertical positions where their shoes 30 have full even engagement with the pipe P. The cooperating surfaces 23 and walls 20 are long and extensive whereby the forces and pressures are well distributed. It is to be noted that the slips 12 have their major portions received in the slots 11 and that the slips bear in the slots throughout the greater portions of their vertical extents, reducing wear, preventing the slips from jumping from the bushing and effectively distributing the forces to the bushing. In the event that the pipe P is to be turned or rotated by the table T the side surfaces 22 of the slip bodies 21 have extensive cooperation with the flat side walls of the slots 11 so that the slips dependably transmit the rotation to the pipe P. The shoes 30 take all the wear resulting from the engagement with the pipe P and the shoes may be easily replaced when worn. Shoes 30, intended for gripping pipe and other objects of various diameters, may be readily provided on the slips 12 to adapt the assembly for the handling of various objects.

The stop members 35 in the lower ends of the slots 11 operate to prevent the slips 12 from passing downwardly from the slots and falling into the well. The members 35 close the lower ends of the slots 11 to prevent the pipe P and couplings and joints on the pipe from entering the slots 11 and from wearing and breaking away the bushing parts at the slots. In many cases the pipe P or object extending through the bushing 10 is off center in the opening 17 so that it bears on the wall of the opening and when the pipe is lowered or raised its joints and couplings strike the bushing at the ends of the opening. The members 35 in fully occupying the lower ends of the slots 11 provide the bushing 10 with a continuous annular surface at the lower end of its opening 17 so that the joints and couplings on the pipe do not wear away or break off the bushing parts defining the slots 11.

Fig. 6 of the drawings illustrates a slightly modified form of slip and bushing assembly. In accordance with the form of the invention illustrated in Fig. 6 of the drawings the bushing 10a is separated or divided at a vertical plane 40 into two unequal sections A¹ and B¹. The plane of division 40 of the bushing 10a is offset or spaced from the central vertical axis of the bushing whereby the section A¹ is considerably larger than the section B¹. The plane of division or separation 40 is tangential to a circle somewhat smaller in diameter than the bushing opening 17a whereby the opening 17a has a portion at the inner side of the small section B¹. The bushing opening 17a is cylindrical or of uniform diameter and is provided with circumferentially spaced slots 11a to receive slips 12a. There are preferably three equally spaced slots 11a provided in the bushing 10a. The slots 11a are spaced and related so that one slot is provided in the section B¹ and two spaced slots occur in the section A¹. The bushing 10a may be identical with the bushing 10 except for the structure just described and the slots 11a and the slips 12a may be identical with the slots and slips of the previously described form of the invention. The slot 11a in the bushing section B¹ is positioned so that its side walls are substantially normal to the plane of separation 40 of the bushing. In the assembly illustrated in Fig. 6 two of the slips 12a are carried by a single one piece section A¹ so that there is no working or spreading of the bushing parts carrying these two slips. The operation of the assembly illustrated in Fig. 6 of the drawings is the same as the operation of the form of the invention illustrated in Figs. 1 to 5, inclusive, of the drawings.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A rotary table bushing comprising, two substantially equal sections, there being an opening between the sections whose longitudinal axis is in the plane of separation of the sections and circumferentially spaced slots in the wall of the opening for receiving slips, one of said slots having its central vertical axis coincident with the plane of separation of the sections.

2. A rotary table bushing comprising, a body having two substantially equal sections, there being a substantially central opening in the body of uniform diameter and three equally circumferentially spaced slots in the wall of the opening for receiving slips, one of said slots having its central vertical axis coincident with the plane of division of the body.

3. A rotary table bushing comprising, a body having two unequal sections, there being a central vertical opening in the body and three equally spaced vertical slots in the wall of the opening for receiving slips, two of said slots being in the larger body section, and the third slot being in the smaller body section.

4. In an assembly of the character described, a gripping slip comprising, a body having an inclined inner surface and a vertical outer side, there being a dove-tailed groove in the said outer side of the body, said groove having a lower wall pitched upwardly and toward said outer side, a replaceable shoe at said outer side, and a dove-tailed tongue on the shoe cooperating with the groove, the tongue having a lower end pitched upwardly and toward said outer side to have locking cooperation with the said lower wall.

DENNIS L. DRISCOLL.